United States Patent
Lascelles

(10) Patent No.: US 7,090,911 B2
(45) Date of Patent: Aug. 15, 2006

(54) COMPOSITE ARTICLES FORMED FROM SHEETS HAVING INTERCONNECTING RIDGES

(76) Inventor: Gary Lascelles, 400 Chestnut St., Danville, KY (US) 40422

( * ) Notice: Subject to any disclaimer, the term of this patent is extended or adjusted under 35 U.S.C. 154(b) by 30 days.

(21) Appl. No.: 10/732,896

(22) Filed: Dec. 10, 2003

(65) Prior Publication Data

US 2004/0170808 A1 Sep. 2, 2004

Related U.S. Application Data

(60) Provisional application No. 60/432,211, filed on Dec. 10, 2002.

(51) Int. Cl.
*B32B 3/28* (2006.01)
*E04C 2/00* (2006.01)
*E04C 3/00* (2006.01)

(52) U.S. Cl. .................. 428/163; 428/53; 428/120; 428/162; 428/172; 52/729.2; 52/782.1

(58) Field of Classification Search ................ 428/53, 428/119, 120, 162, 163, 167, 172; 52/729.1, 52/729.2, 729.4, 730.7, 782.1; 144/332
See application file for complete search history.

(56) References Cited

U.S. PATENT DOCUMENTS

| | | | |
|---|---|---|---|
| 183,073 A | 10/1876 | Setchell | |
| 1,531,983 A * | 3/1925 | Sawyer | .................. 428/162 |
| 1,815,558 A | 7/1931 | Gammeter | |
| 1,875,074 A | 8/1932 | Mason | |
| 2,454,719 A | 11/1948 | Scogland | |
| 2,517,069 A | 8/1950 | Weymouth | |
| 2,534,137 A | 12/1950 | Lewis | |
| 2,698,915 A * | 1/1955 | Piper | ...................... 315/362 |
| 2,960,146 A | 11/1960 | Williams | |
| 3,043,730 A * | 7/1962 | Mountford | ................. 428/159 |
| 3,137,604 A | 6/1964 | Bosch | |
| 3,150,029 A | 9/1964 | Ferrand | |
| 3,222,697 A | 12/1965 | Scheermesser | |
| 3,235,439 A | 2/1966 | Schultheiss | |
| 3,285,768 A | 11/1966 | Habib | |
| 3,364,638 A | 1/1968 | Santangelo | |
| 3,558,394 A | 1/1971 | Marby | |
| 3,607,589 A | 9/1971 | Schirtzinger | |
| 3,669,821 A | 6/1972 | Sharp | |
| 3,748,214 A | 7/1973 | Withers | |
| 3,876,492 A | 4/1975 | Schott | |
| 4,084,029 A | 4/1978 | Johnson et al. | |
| 4,220,100 A | 9/1980 | Palomo et al. | |
| 4,610,900 A | 9/1986 | Nishibori | |
| 4,631,221 A | 12/1986 | Disselbeck et al. | |
| 4,718,214 A | 1/1988 | Waggoner | |
| 4,946,526 A | 8/1990 | Petty-Galis et al. | |
| 5,100,716 A | 3/1992 | Juneau | |
| 5,123,359 A | 6/1992 | DelBalso | |
| 5,215,806 A | 6/1993 | Bailey | |
| 5,232,762 A | 8/1993 | Ruby | |
| 5,433,156 A | 7/1995 | Hutchison | |
| 5,551,353 A | 9/1996 | Fiedler | |

(Continued)

*Primary Examiner*—Donald J. Loney
(74) *Attorney, Agent, or Firm*—Dinsmore & Shohl LLP

(57) ABSTRACT

A composite article of manufacture formed from at least three sheets of material laminated to one another. At least one surface of each of the sheets has a plurality of spaced-apart ridges which extend in a predetermined direction along the surface, and each of the pluralities of ridges is arranged so as to nest between a plurality of ridges on an adjacent sheet.

14 Claims, 4 Drawing Sheets

U.S. PATENT DOCUMENTS

| | | |
|---|---|---|
| 5,618,601 A | 4/1997 | Ruby |
| 5,738,924 A | 4/1998 | Sing |
| 5,804,285 A | 9/1998 | Kobayashi et al. |
| 5,876,835 A | 3/1999 | Nobel et al. |

* cited by examiner

COMPOSITE ARTICLES FORMED FROM SHEETS HAVING INTERCONNECTING RIDGES

CROSS-REFERENCE TO RELATED APPLICATION

This non-provisional patent application claims the benefit of U.S. Provisional Application No. 60/432,211 filed Dec. 10, 2002, which is incorporated herein by way of reference.

BACKGROUND OF THE INVENTION

1. Field of the Invention

The present invention relates to composite articles, particularly those suitable for use as construction materials.

2. Description of Related Art

As natural resources are depleted, there is an increased need for replacing naturally-derived materials with man-made components. This is particularly true for construction materials, which are typically made from wood.

Although various plastics can be suitable for replacing construction materials made from wood, it may be difficult to provide a plastic replacement component which has the same strength and rigidity as the wood component it is intended to replace. Thus, there is a need for composite articles manufactured from plastic, particularly construction materials which can be readily used in place of traditional wood materials.

DETAILED DESCRIPTION

The present invention provides composite articles of manufacture, such as composite sheets and other articles which may be used in place of conventional building materials. The composite articles of the present invention are formed from at least three corrugated sheets, and more preferably at least four. At least one side of each sheet has a series of ridges (or ribs) which extend parallel to one another in a spaced-part relationship. The ridges are arranged such that they will matingly engage corresponding ridges provided on an adjacent sheet, with the ridges on one sheet nesting between adjacent ridges on the other sheet. In addition, the ridges are arranged such that, in the final composite article, the ridges extend in at least two different directions. In this manner, the composite structure will have increased strength and rigidity. The nesting ridges also provide additional surface area for adhering the individual sheets to one another, further strengthening the final, composite product.

Plastic is particularly suited for the manufacture of the composite articles of manufacture according to the present invention. The individual plastic layers used to construct the composite articles may be manufactured by any of a variety of means known to those skilled in the art, such as injection molding or extrusion.

Composite articles of manufacture in accordance with the present invention may be provided in any of a variety of forms, shapes and sizes. One particular embodiment is a composite sheet 20 depicted in FIG. 1. As further described herein, sheet 20 may eve serve as the basic structure from which other forms are cut and/or assembled (such as the elongate beam depicted in FIG. 4 or the I-beam depicted in FIG. 5). Sheet 20 may be provided in any size and shape, particularly those suitable for use in building construction and the like. For example, sheet 20 may be used in place of wood sheets, particularly plywood sheets. As such, sheet 20 may be provided in a size corresponding to that of a conventional plywood sheet, namely approximately 8 feet in length, 4 feet in width, and a thickness ranging from about ¼ inch to about 1 inch (such as a thickness of about ¾ inch). In this manner, sheet 20 can be used in place of conventional plywood sheeting in building construction and in other applications in which conventional plywood sheets are typically used.

Figure 1:
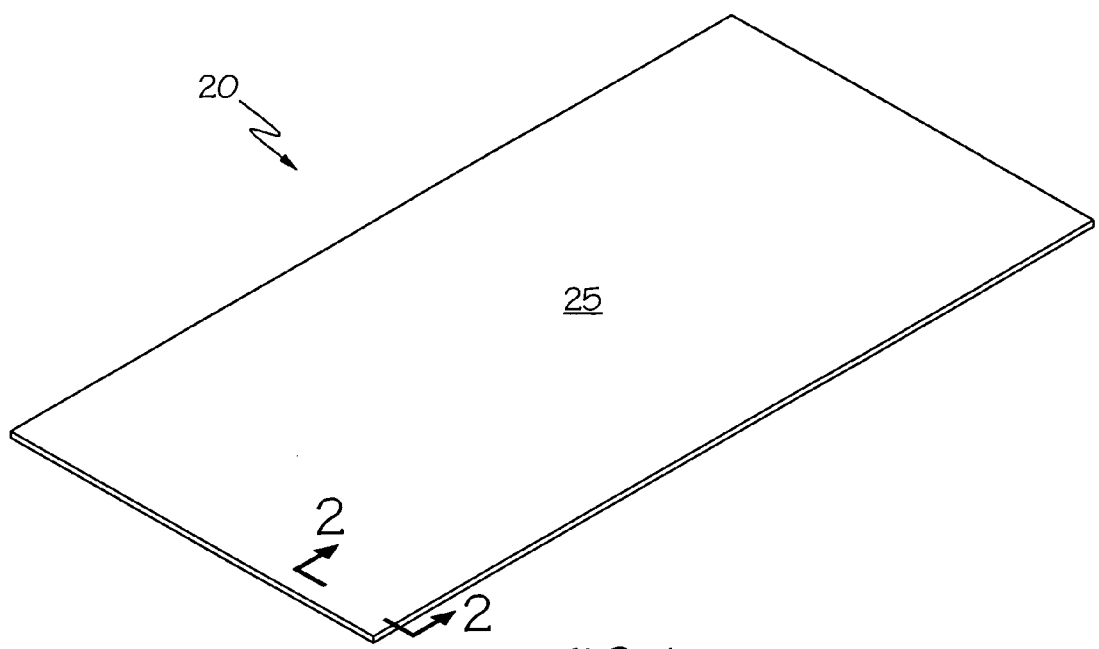
FIG. 1 is a perspective view of a composite sheet according to one embodiment of the present invention.
Figure 2:
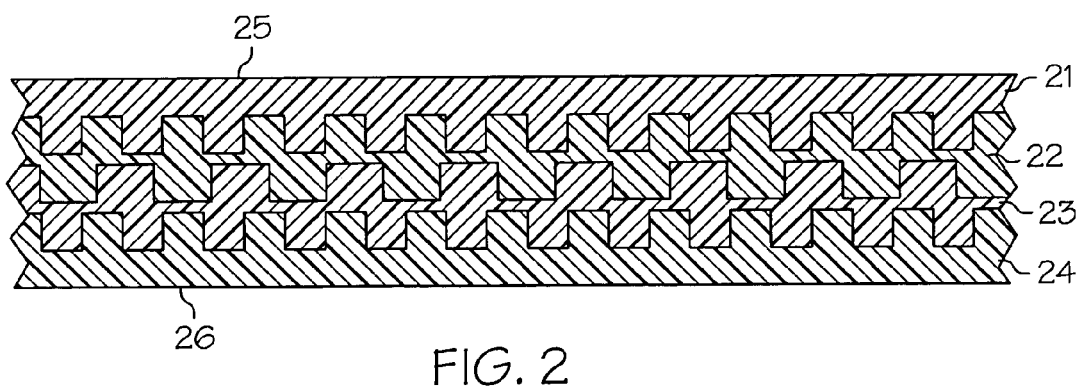
FIG. 2 is a cross-sectional view of the sheet of FIG. 1, taken along the line 2—2 thereof.
Figure 3:
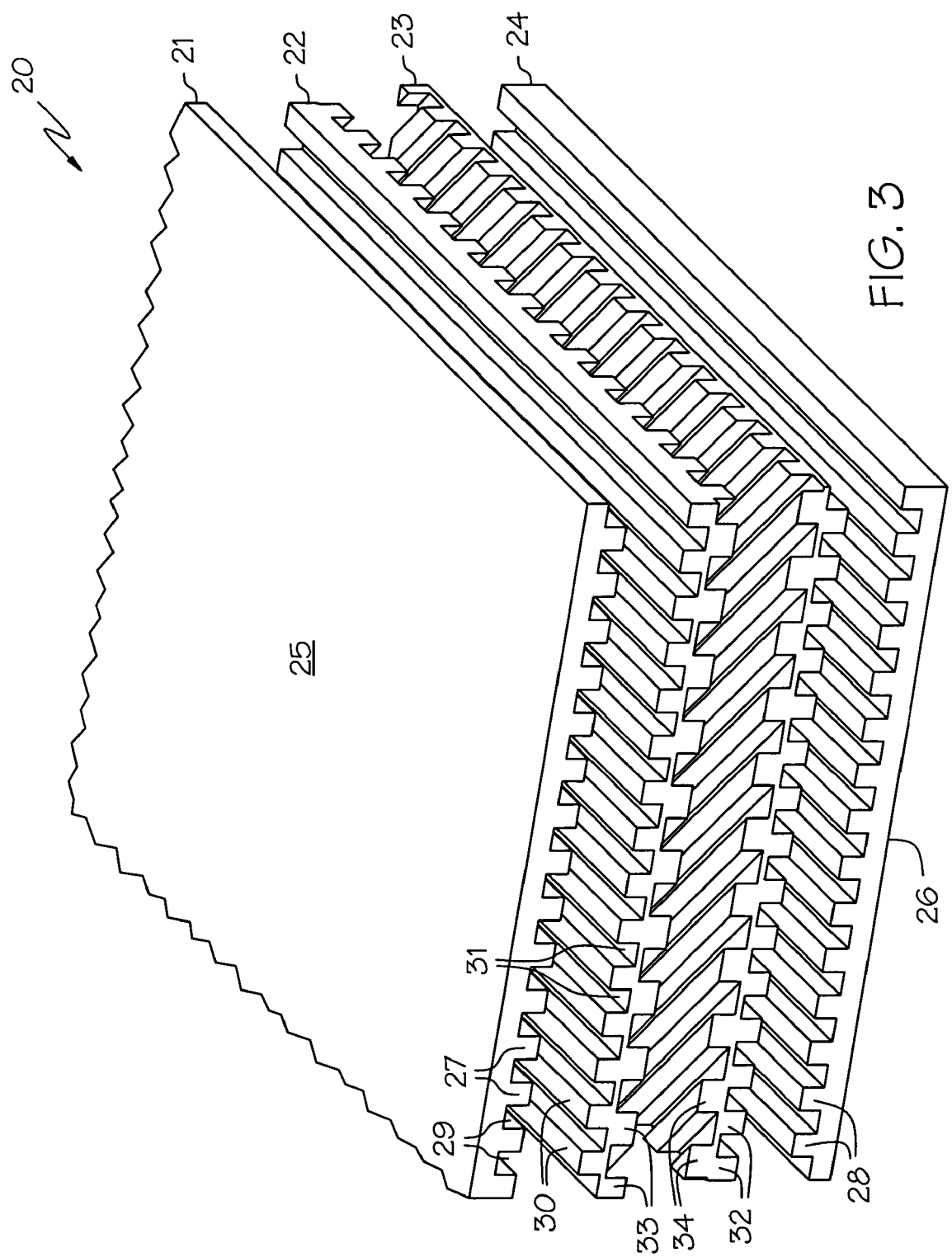
FIG. 3 is an exploded, perspective view of a portion of the sheet of FIG. 1.

FIG. 2 is a cross-sectional view of sheet 20, taken along line 2—2 of FIG. 1, while FIG. 3 is an exploded, perspective view of a portion of sheet 20. As best seen in FIGS. 2 and 3, sheet 20 is formed from four corrugated sheets, namely individual sheets, or layers, 21, 22, 23 and 24. These corrugated sheets are secured to one another by any of a variety of suitable adhesives (or any other known method for adhering plastic, such as thermal bonding). Suitable plastics which may be used for the individual layers include PVC and polycarbonates, however the present invention is not limited to any particular type of plastic. Even plastics reinforced with various other types of materials can be employed without departing from the scope of the present invention.

In the particular embodiment shown in FIGS. 1–3, the outermost sheets or layers 21 and 24 have ridges (or ribs or corrugations) on only one surface. Thus, top and bottom surfaces 25 and 26, respectively, of sheet 20 are smooth. Of course these two surfaces may be configured in any desired manner. For example, various types of surface ornamentation might be provided on these surfaces (e.g., simulated wood grain).

On the surfaces opposite to smooth surfaces 25 and 26, a series of ridges (or ribs) are provided, as shown. In the particular embodiment shown in FIGS. 2 and 3, a plurality of ridges 27 extend lengthwise along the lower surface of sheet 21. Ridges 27, like all of the ridges (or corrugations) described herein, can have any of a variety of cross-sectional shapes, sizes and spacings. Thus, the rectangular cross-sectional shape of ridges 27 depicted in the figures is merely exemplary, as other shapes may be employed (such as circular, triangular, etc.). Ridges 27 are spaced apart from one another such that a groove (or channel) 29 is provided between adjacent ridges 27. In the embodiment shown, the width and shape of grooves 29 corresponds to the width and shape of ridges 27, and ridges 27 (and hence grooves 29) extend parallel to one another.

Sheet (or layer) 24, like sheet 21, also has a series of ridges 28 which extend lengthwise along the upper surface of sheet 24 (i.e., the surface located opposite to smooth surface 26). Also, the size and spacing of ridges 28 may be identical to the size and spacing of ridges 27. In fact, sheet 24 may be identical to sheet 21, but simply turned upside down (i.e., the flat surface oriented downwardly with the ridges extending in the same lengthwise direction). In this manner, separate molds, dies or other machinery is not need in order to manufacture both sheets 21 and 24, thus simplifying the manufacturing process. It is also contemplated that the plastic layers used to construct the composite articles of the present invention may be manufactured initially in sizes much greater than that of the final product. These oversized sheets may be assembled in the manner shown in FIG. 3, and thereafter cut to the appropriate size and shape, thus further simplifying the manufacturing process.

Turning to inner sheets or layers 22 and 23, these sheets have ridges (or corrugations) extending along both surfaces. In the particular embodiment shown, ridges 30 extend lengthwise along the upper surface of sheet 22, and are spaced apart from one another so as to provide grooves 31 therebetween. The size, shape and spacing of ridges 30 correspond to that of ridges 27 on sheet 21 such that ridges 27 and 30 will matingly engage one another, with ridges 27 positioned within grooves 31 and ridges 30 positioned within grooves 29. Similarly, ridges 32 extend lengthwise along the underside of sheet 23, and are sized, shaped and spaced so as to matingly engage ridges 28 on sheet 24. In this manner, ridges 32 will nest between ridges 28, thereby providing mating engagement between sheets 23 and 24.

The underside of sheet 22 and the upper surface of sheet 23 also have a series of ridges which are sized, configured and spaced so as to matingly engage one another (i.e., the ridges on one surface nesting between adjacent ribs on the opposing surface of the other sheet). However, these "interior ridges" are arranged so as to extend in a direction different from that of the outermost ridges described previously. In the particular embodiment shown, ridges 33 extend along the underside of sheet 22, and ridges 34 extend along the upper surface of sheet 23, at an angle of about 45° with respect to the length of sheet 20 (and with respect to ridges 27, 30, 28 and 32).

As before, ridges 33 and 34 may have a rectangular cross-sectional shape, and are spaced evenly across the surface of these sheets, thus providing grooves between adjacent ridges. In this manner, sheets 22 and 23 may be joined to one another such that ridges 33 nestle between ridges 34 in the same manner as described previously. However, since ridges 33 and 34 extend in a direction different than the previously described ridges (i.e., ridges 27, 30, 32 and 28), the resulting sheet will have improved strength and rigidity.

As will also be apparent from FIG. 3, sheets 22 and 23 are identical to one another and, like sheets 21 and 24, do not require separate molds, dies or other manufacturing equipment. In the configuration of FIG. 3, sheet 23 corresponds to sheet 22 turned upside down and rotated 180° in order to provide the proper orientation of the ridges. Thus, the composite structure comprising four layers shown in FIG. 3 only requires two different sheet designs, as sheets 21 and 24 are identical to one another in structure, as are sheets 22 and 23. While the interlocking or mating ridges described above provide increased strength and rigidity to the final product, manufacturing is greatly simplified due to the fact that sheets 21 and 24 are identical to one another as are sheets 22 and 23. This feature greatly simplifies the fabrication process. In addition, if a thicker sheet 20 is desired, this may be accomplished simply by inserting one or more additional pairs of sheets 22 and 23 in the composite structure (as further described herein with respect to FIG. 6).

It should also be kept in mind that the directions in which the mating ridges extend is less important than providing mating sets of ridges which extend in at least two different directions. By way of example, interior ridges 33 and 34 depicted in FIG. 3 may alternatively extend across the width of sheet 20, perpendicular to ridges 27, 30, 32 and 28. In embodiments of the present invention, the mating ridges (or ridge pairs) may extend in at least two different directions wherein the angle between these two directions is between about 30° and about 90°, or between about 45° and about 75°. As mentioned previously, in the embodiment shown in FIG. 3, the mating ridges extend in two directions having an angle of about 45° therebetween (i.e., the outermost ridges in the composite structure extend parallel to the length of sheet 20, while the innermost ridges 33 and 34 extend at an angle of about 45° with respect to the length of sheet 20).

Composite articles according to the present invention may also be made from three plastic sheets having mating ridges which extend in at least two different directions. For example, the structure shown in FIG. 3 can be modified by eliminating sheet or layer 23 and reconfiguring ridges 28 such that they extend at an angle of about 45° with respect to the length of sheet 20. In this manner, ridges 28 would then be capable of mating engagement with ridges 33 provided on the underside of sheet 22.

In the same fashion, mating ridges extending in a third (or even more) direction may also be provided. For example, ridges 32 and 28 in the structure depicted in FIG. 3 could be reconfigured so as to extend across the width of sheet 20 (i.e., perpendicularly to ridges 27 and 30), or even diagonally (particularly in the opposite diagonal direction as compared to ridges 33 and 34). Although such configurations will further increase the strength and rigidity of the resulting sheet, interior sheets 22 and 23 would obviously no longer be identical in configuration (nor would sheets 21 and 24 be identical in structure).

Figure 6:
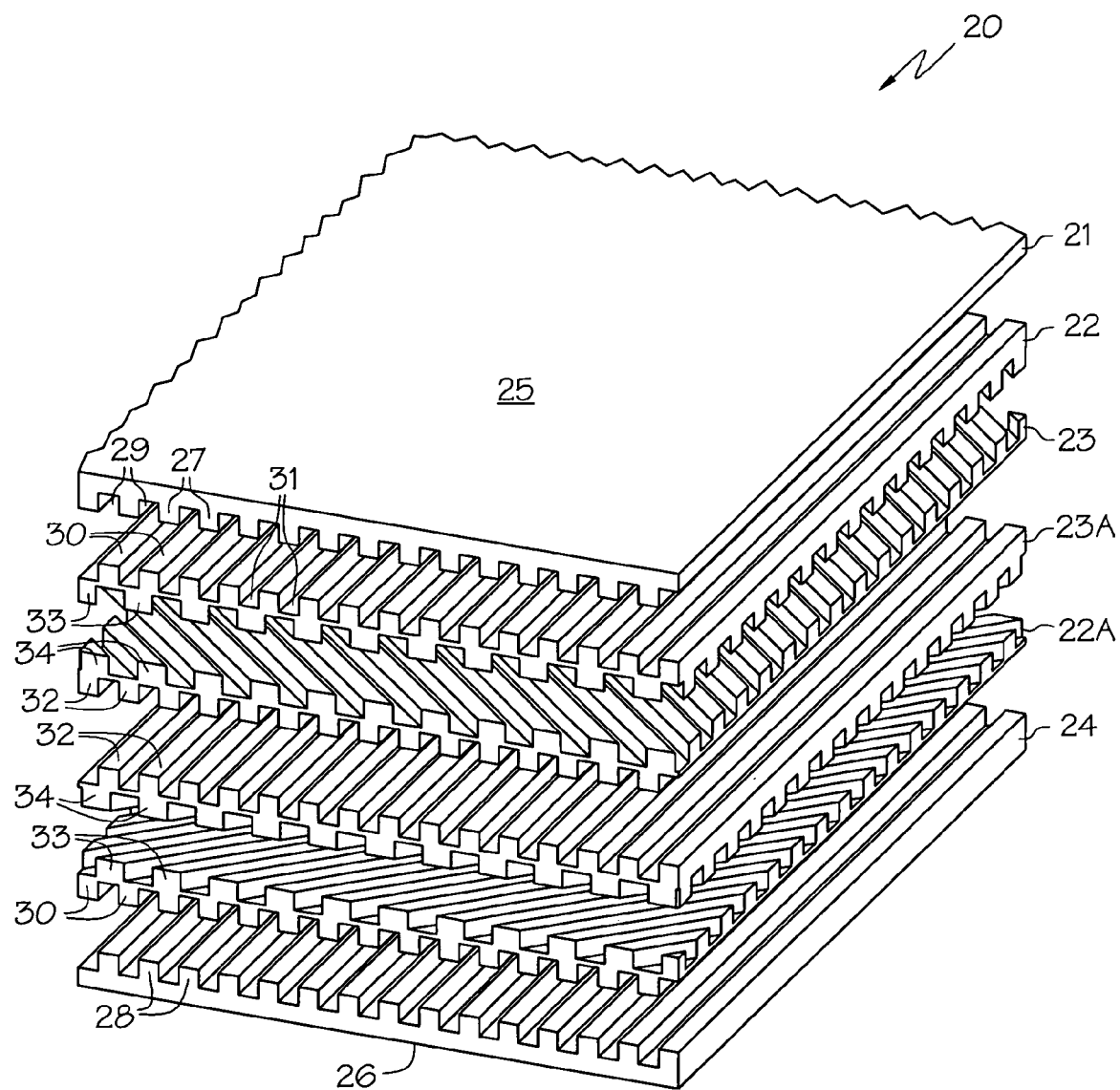
FIG. 6 is an exploded, perspective view of yet another alternative embodiment of a composite sheet according to the present invention.

Composite articles of the present invention can also be manufactured using more than four sheets or layers of corrugated plastic. By way of example, one or more additional interior layers may be included in the structure depicted in FIG. 3. FIG. 6 depicts just such a structure, wherein two additional layers or sheets 22 and 23 (identified as 22A and 23A, respectively) have been included in the composite structure. These additional sheets 22A and 23A, however, have been oriented such that the diagonally-extending ribs thereon extend in the opposite diagonal direction as compared to the diagonally-extending ribs on sheets 22 and 23.

Sheet 23A is identical to sheet 23, with longitudinally-extending ridges 32 oriented upwardly and diagonally-extending ridges 34 oriented so as to extend in the opposite diagonal direction as compared to ridges 34 on sheet 23. Similarly, sheet 22A is identical to sheet 22, with longitudinally-extending ridges 30 oriented downwardly and diagonally-extending ridges 33 oriented upwardly and extending at a diagonal direction opposite to that of ridges 33 on sheet 22. In this manner, the diagonally-extending ridges 33 and 34 on sheets 22A and 23A, respectively, will nest between one another, longitudinally-extending ridges 30 on sheet 22A will nest between longitudinally-extending ridges 28 on sheet 26, and longitudinally-extending ridges 32 on sheet 23A will nest between longitudinally-extending ridges 32 on sheet 23. Thus, in the final composite structure of FIG. 6, three pairs of nesting ridges extend lengthwise across sheet 20, one pair of nesting ridges extend diagonally at an angle of about 45° with respect to the longitudinally-extending ridges, and another pair of nesting ridges extend diagonally at an angle of about 135° with respect to the longitudinally-extending ridges. In other words, the final composite product has ridges extending lengthwise with respect to sheet 20, as well across both diagonal directions. By orienting the ridges in this manner, the composite sheet has further increased strength and rigidity as compared to the structure of FIG. 3.

It will also be noted that, even though the composite structure of FIG. 6 is formed from six layers of corrugated plastic and has mating ridges which extend in three different directions, the four innermost layers 22, 23, 22A and 23A are identical to one another in structure, and layers 21 and 24 are also identical to one another in structure. Thus, the composite structure of FIG. 6 only requires two different sheet configurations.

Of course any number of additional layers can be provided in the composite structures of the present invention in order to provide the desired thickness, strength and rigidity. By way of example, one or more additional pairs of sheets 22 and 23 may be provided in the interior of the composite structure in order to provide the desired thickness, strength and rigidity. In addition, in the composite structure of FIG. 6, it should be noted that the pairs of nesting ridges extend in three different directions, even though only two different sheet configurations are used. Increased strength and rigidity is provided without a corresponding increase in manufacturing complexity. Thus, the present invention provides significant flexibility in the manufacture of composite sheets for a variety of applications.

Although the present invention has been described with respect to a planar sheet 20, such as a sheet intended to be used in place of conventional plywood sheets, the present invention is not so limited. In particular, composite articles according to the present invention can be provided in an endless variety of sizes, shapes and configurations.

Figure 4:
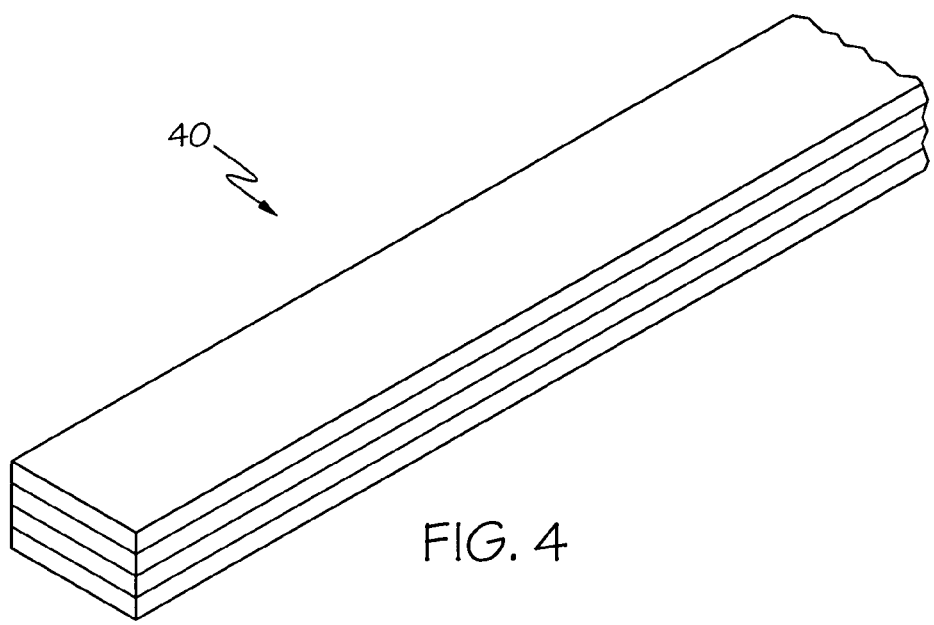
FIG. 4 is an alternative embodiment of the present invention, namely a composite beam which may be used in place of conventional lumber.

Since the composite articles of the present invention are particularly useful for replacing conventional wood building materials, the composite articles may be provided in sizes and shapes corresponding to commonly-available wood members and structures. By way of example, FIG. 4 depicts a composite article of the present invention having a "nominal" size corresponding to that of conventional 2×4 lumber (i.e., a width of approximately 3½ inches, a thickness of approximately 1½ inches, and any desired length, such as approximately 8 feet). The "2×4" composite member 40 of FIG. 4 may be manufactured in the same manner as described previously with respect to sheet 20, with the thickness of layers 21–24 chosen so as to provide the desired thickness of member 40. Since the size of a composite article according to the present invention is limited only by manufacturing limitations with respect to the formation and handling of the various corrugated sheets, member 40 can be readily cut from a much larger composite member. In this manner, multiple 2×4 members 40 may be cut from a single composite sheet 20. This also allows manufacturers to easily cut various other sizes of composite members intended to replace conventional lumber (such as nominal 2×2, 2×6, 2×8, etc., lumber).

Figure 5:
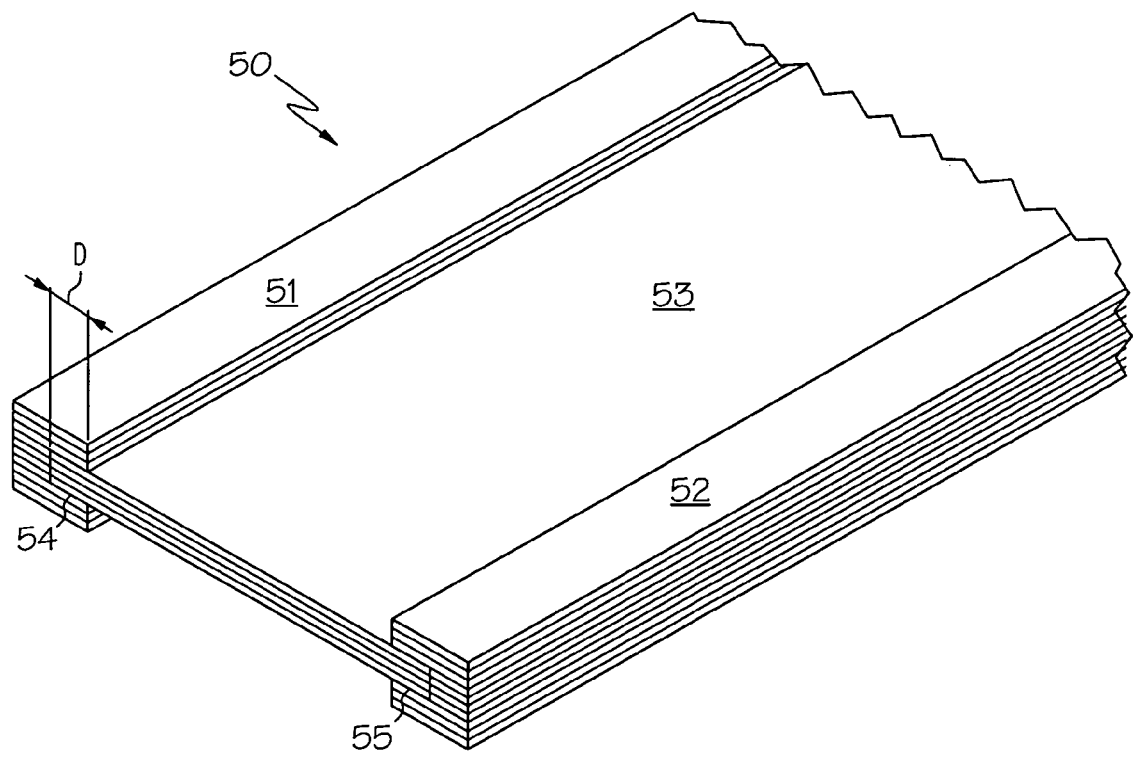
FIG. 5 is an I-beam according to yet another embodiment of the present invention.

FIG. 5 depicts yet another alternative embodiment of a composite article according to the present invention, namely I-beam 50. I-beam 50 generally comprises three individual components which are joined together to form the I-beam structure. Specifically, I-beam 50 comprises first and second flange members 51 and 52 which are interconnected by a web member 53.

Each of the three components of I-beam 50 may be formed as a composite, laminated structure similar to those described previously. For example, web member 53 may comprise an elongated rectangular sheet comprising four or six layers (or even more) and formed in the same manner as sheet 20 shown in FIG. 3 or 6. Of course, as described previously, web member 53 may be formed from any number of corrugated plastic sheets laminated to one another, with pairs of nesting ridges extending in two or more directions.

Flange members 51 and 52 are elongate in nature, and may have a generally rectangular (or even square) cross-sectional shape. Since flange members 51 and 52 are thicker than web member 53, however, flange members 51 and 52 may be formed from a greater number of layers as compared to web member 53. For example, flange members 51 and 52 may comprise at least about six, or even at least about eight or ten corrugated sheets having interconnecting ridges. The additional sheets, however, may be configured in the same manner as shown in FIG. 3 or 6. By way of example, additional sheets 22 and sheet 23 may be provided in the structure of FIG. 6 in order to provide a thicker sheet from which the flange members are provided. Additional layers may be provided merely by providing additional pairs of sheets 22 and 23 in the composite structure. Since an elongate I-beam will generally require more strength than a planar sheet used in place of conventional plywood, it may be necessary to ensure that the interlocking ridges of the corrugated layers used to form I-beam 50 extend in at least three different directions (such as the configuration shown in FIG. 6).

Each flange member 51 and 52 includes a rectangular groove or cutout portion 54 and 55, respectively, which is sized and configured to receive a portion of web member 53 therein. These grooves may be provided by first forming a rectangular beam comprising the corrugated sheets described previously, and thereafter cutting away (e.g., by routing) a portion of the beam to provide the appropriately-sized cutout. Alternatively, the individual layers used to form each flange member may be sized and configured such that, after assembly of the sheets, the appropriately-sized grooves 54 and 55 will be provided. The depth D of each groove should be sufficient to provide the desired strength and rigidity for I-beam 50, and will vary depending upon the size of the I-beam member as well as its intended use. The opposing longitudinal edges of web member 53 may be inserted into grooves 54 and 55, as shown, and secured therein (such as by use of an appropriate adhesive).

In addition, I-beam 50, and, in fact, any of the other composite structures of the present invention may be molded or formed in order to provide a somewhat curved shape for increased strength and rigidity during use. In particular, I-beam 50, like conventional wooden I-beams, may be provided in a "crowned" configuration.

I claim:

1. A composite article of manufacture formed form at least three sheets of material laminated to one another, wherein:
    each of said sheets has first and second surfaces;
    at least one surface of each of said sheets has a plurality of spaced-apart ridges which extend in a predetermined direction along the plane of said at least one surface;
    each of said pluralities of ridges are arranged so as to nest between a plurality of ridges on an adjacent sheet; and
    said pluralities of ridges extend in at least two different predetermined directions,
    wherein said article comprises at least four sheets of material laminated to one another, wherein two of said sheets have a plurality of spaced-apart ridges extending along both the first and second surfaces of each sheet, and two of said sheets have a plurality of spaced-apart ridges extending along one of said first and second surfaces.

2. The composite article of manufacture of claim 1, wherein said article has the shape of a planar sheet, an elongate beam or an elongate I-beam.

3. The composite article of manufacture of claim 1, wherein said pluralities of ridges extend in at least three different directions.

4. The composite article of manufacture of claim 1 wherein the angle between said at least two different predetermined directions ranges from about 30 degrees to about 90 degrees.

5. The composite article of manufacture of claim 1, wherein said first surfaces of two sheets of said at least three sheets comprise said plurality of spaced-apart ridges and said second surfaces of said two sheets comprise end portions.

6. A composite article of manufacture formed form at least three sheets of material laminated to one another, wherein:
    each of said sheets has first and second surfaces;
    at least one surface of each of said sheets has a plurality of spaced-apart ridges which extend in a predetermined direction along the plane of said at least one surface;
    each of said pluralities of ridges are arranged so as to nest between a plurality of ridges on an adjacent sheet; and
    said pluralities of ridges extend in at least two different predetermined directions,
    wherein said at least two different predetermined directions comprises a longitudinal orientation and a diagonal orientation.

7. The composite article of manufacture of claim 6, wherein the angle between said at least two different predetermined directions ranges from about 45 degrees to about 75 degrees.

8. A composite article of manufacture comprising:
    an upper layer comprising first and second surfaces, wherein at least one of said surfaces comprises a plurality of spaced-apart ridges extending in a first predetermined direction along the plane of said at least one surface;
    a lower layer comprising first and second surfaces, wherein at least one of said surfaces comprises a plurality of spaced-apart ridges extending in a second predetermined direction along the plane of said at least one surface; and
    at least one intermediate layer comprising first and second surfaces, wherein said surfaces comprise a plurality of spaced-apart ridges configured to matingly engage with said plurality of spaced-apart ridges extending in said first and second predetermined directions of said upper and lower layers,
    wherein said first predetermined direction comprises a longitudinal orientation and said second predetermined direction comprises a diagonal orientation.

9. The composite article of manufacture of claim 8, wherein said article has the shape of a planar sheet, an elongate beam or an elongate I-beam.

10. The composite article of manufacture of claim 8, wherein the angle between said first predetermined direction and said second predetermined direction ranges from about 45 degrees to about 75 degrees.

11. The composite article of manufacture of claim 8, wherein said first surfaces of said upper and lower layers comprise said plurality of spaced-apart ridges and said second surfaces of said upper and lower layers comprise end portions.

12. A composite article of manufacture comprising:
    an upper layer comprising first and second surfaces, wherein at least one of said surfaces comprises a plurality of spaced-apart ridges extending in a first predetermined direction along the plane of said at least one surface;
    a lower layer comprising first and second surfaces, wherein at least one of said surfaces comprises a plurality of spaced-apart ridges extending in a second predetermined direction along the plane of said at least one surface; and
    at least one intermediate layer comprising first and second surfaces, wherein said surfaces comprise a plurality of spaced-apart ridges configured to matingly engage with said plurality of spaced-apart ridges extending in said first and second predetermined directions of said upper and lower layers,
    wherein said article comprises two intermediate layers, wherein said first intermediate layer has a first surface having a plurality of spaced-apart ridges configured to matingly engage said at least one surface of said upper layer and a second surface having a plurality of spaced-apart ridges configured to matingly engage a plurality of spaced-apart ridges on a first surface of said second intermediate layer, wherein a plurality of spaced-apart ridges on a second surface of said second intermediate layer are configured to matingly engage said plurality of ridges on said at least one surface of said lower layer.

13. The composite article of manufacture of claim 12, wherein the angle between said first predetermined direction and said second predetermined direction ranges from about 30 degrees to about 90 degrees.

14. The composite article of manufacture of claim 12, wherein said plurality of ridges configured to matingly engage between said at least one surface of said upper layer and said first surface of said first intermediate layer, said second surface of said first intermediate layer and said first surface of said second intermediate layer, and said second surface of said second intermediate layer and said at least one surface of said lower layer extend in three different predetermined directions.

* * * * *